Jan. 8, 1929. R. P. PERRY Re. 17,187

SHINGLE STRIP
Filed Jan. 11, 1922

INVENTOR
Ray P. Perry
BY
Chas. W. Mortimer
ATTORNEY

Reissued Jan. 8, 1929. Re. 17,187

UNITED STATES PATENT OFFICE.

RAY P. PERRY, DECEASED, LATE OF UPPER MONTCLAIR, NEW JERSEY, BY THE BARRETT COMPANY, ASSIGNEE, OF NEW YORK, N. Y.

SHINGLE STRIP.

Original No. 1,593,594, dated July 27, 1926, Serial No. 528,461, filed January 11, 1922. Application for reissue filed June 27, 1928. Serial No. 288,746.

This invention relates to a shingle strip and method of cutting the same from a strip of roofing material. It is especially applicable to a shingle strip of the character made up of a fibrous base that is saturated with waterproofing material and covered with a coating of plastic waterproofing material, such as pitch, or asphalt, and having applied thereto a layer of wear-resisting material, such as crushed slate, stone, etc.

By this invention the shingle strips can be cut from a wide sheet of roofing material of the character indicated without waste of material, and the strips can be so applied to a roof as to cover the same adequately with a saving of material, and at the same time provide against leakage. The exposed edges of the strips, when laid on a roof, can be so fashioned that they will simulate the appearance of individual shingles slightly spaced apart. This effect can be produced in a variety of ways as indicated below, thereby presenting a pleasing effect and avoiding the monotony and cheap appearance of many of the roofing strips of this art.

The invention will be understood from the description in connection with the drawings, in which—

Figure 1:
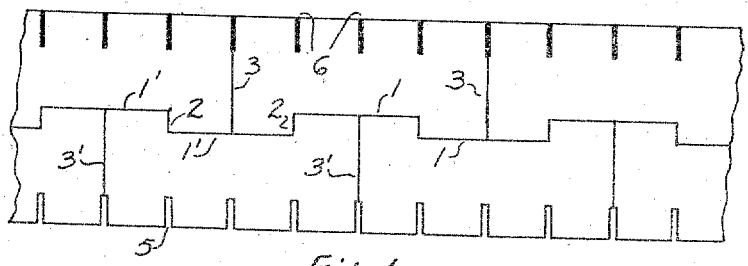
Fig. 1 is a plan view of a sheet of roofing material indicating how the individual strips are cut therefrom.

In the drawings reference characters 1 and 1′ indicate a series of slits or lines parallel with the edges of a roofing strip, the lines 1 and 1′ lying near the middle of the sheet and being slightly offset from each other, and their ends being joined by perpendicular lines 2, along which lines 1, 2, 1′ the sheet is cut to form the strips, which strips are severed from each other along the lines 3, 3′ that are perpendicular to the edges of the sheet. The lines 3 along one side of the sheet may extend from the edge thereof to the middle points of the lines 1, while the lines 3′ along the other side may extend from the edge of the sheet to the middle points of the lines 1′, thus defining the lengths of the shingle strips.

Figure 2:
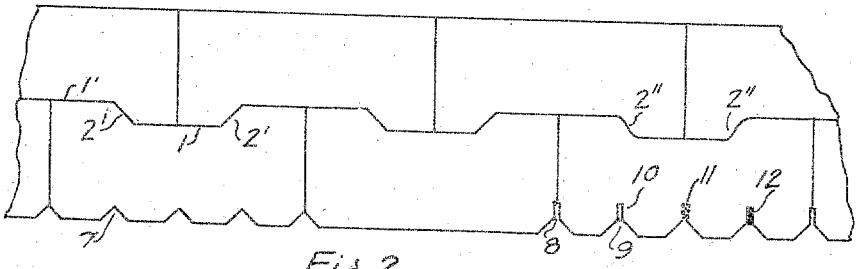
Fig. 2 is a similar view showing slight modifications of the shapes of the strips.

The sheet shown in Fig. 2 is cut in a similar way except that the lines 2′ corresponding to the lines 2 of Fig. 1 are sloping or arc curved as shown at 2″. It will thus be seen that in each case shingle strips are produced having the end portions thereof wider than the central portions, and the sum of the lengths of the extensions at the ends are substantially equal to the length of the narrower central portions. Also a shingle strip is produced having narrow elongated rectangular spaced tabs along one edge oppositely disposed with respect to the shingle-like extensions on the other edge of the shingle strip, the sum of the areas of the tabs being equal to the area of the spaces adjoining the tabs and formed on the edge of the shingle in providing the tabs when cutting the shingle from the strip.

In order to improve the appearance of the strips when laid on a roof, the edges of the same may be formed into a plurality of spaced tabs. This may be done in a variety of ways, as for example, a series of slots may be cut along the edge of the sheet of roofing material as indicated at 5 in Fig. 1; or a number of black lines may be produced along the edge, as indicated at 6 in Fig. 1, by pressing a hot implement of the proper width and length upon the mineral covered surfacing, thereby causing the black waterproofing material to strike through and be visible; or the edges may be provided with a series of V-shaped slots 7, as indicated at the lower left hand end of Fig. 2; or the edges may be provided with a series of V-shaped slots terminating in a straight slot, as indicated at 8; or a V-shaped slot may be used, as indicated at 9, having a strip 10 of contrasting material applied at the end of the V-shaped slot; or the V-shaped slots may terminate in a short area 11 of different colored granular material; or the V-shaped slots may have at the ends thereof the black waterproofing material brought to the surface, as indicated at 12 in a manner similar to that already described in connection with the markings 6 of Fig. 1; or a combination of two or more of these and other schemes for improving the appearance of the exposed edges of the strips may be used.

Figure 4:
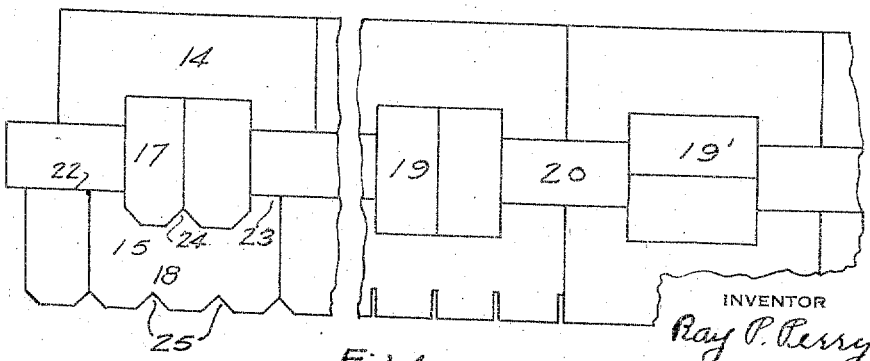
Fig. 4 is a modification showing different ways of cutting the shingle strips from a sheet of roofing material, and at the same time producing individual shingles.

In the modification shown in Fig. 4 strips 14 and 15, similar in shape to those already described, may be cut out as indicated, and at the same time single shingles 17 with slightly pointed ends 18 or single shingles 19 with square corners may be cut out from the middle portion of the sheet. It will be obvious that the single shingles may be cut out as shown at 19′, leaving single shingles 20 as indicated, and at the same time, the edges of the shingle strips may be provided with tabs in a suitable manner.

Figure 3:
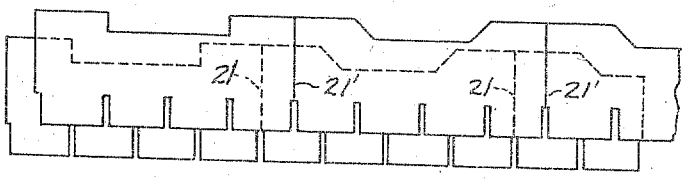
Fig. 3 is a plan view indicating two horizontal courses as laid upon a roof.

It will usually be desirable to have the slots or markings, which separate the tabs from each other, of a length corresponding to the amount of exposure of the strip when laid on a roof, so that the lower edge of the next upper course of strips will be adjacent to the upper ends of the slots or markings, as indicated in Fig. 3. The joints 21 and 21′ formed at the adjacent ends of strips in horizontal rows should be broken, and this result can be accomplished as indicated in Fig. 3, while at the same time the wide ends of the strips avoid the danger that water will creep or be blown upward under one strip and over the upper edge of the underlying strip even when the horizontal rows are laid with a greater exposure to the weather than is the case with ordinary shingles. Either the shingle strips with the rectangular extensions at the ends or the ones with the beveled extensions, shown in Fig. 2, may be used on the roof, or a mixture of the same may be used. Instead of having a sheet of roofing material wide enough to form two series of strips, as indicated in Figs. 1 and 2, the sheet may be made wide enough to form four series of strips for example.

It will be clear from the disclosure that changes and modifications may be made and different features may be variously combined without departing from the spirit or scope of the invention. For example, one of the extensions at the ends of the strips may be made somewhat longer than the other in a direction parallel to the edge of the strip that is to be exposed, thus making it possible for the joint 21, Fig. 3, to be placed farther to the left, so that the joint 21′ can be spaced a greater distance from the joint 21 and still be over the central portion of the longer extension that lies underneath. This will result in decreasing the danger of leakage of the roof at the joints. An illustration of this feature is shown at the lower left hand end of Fig. 4 where the extension 22 at one end of the strip 15 is longer than the extension 23 at the other end. This shingle 15 is also shown with the tab 24 spaced between the V-shaped slots 25 along the other edge of the strip 15.

Claims:

1. A shingle strip wider at its ends than at its middle portion, the widest portion of said shingle strip being less than the length of said strip.

2. A shingle strip having its widest portions at its ends, the widest portion of said shingle strip being less than the length of said strip.

3. A shingle strip having rectangular tabs along one edge and rectangular extensions along its other edge at its ends only.

4. A shingle strip having tabs along one edge and extensions along its other edge at its ends only; the outer edge of said extensions being parallel with the edge having the tabs.

5. A rectangular shingle strip having rectangular extensions along one of its longer edges at its ends only, the widest portion of said shingle strip being less than the length of said strip.

6. A shingle strip having a cut out portion at the middle of one of its longest edges, said cut out portion being substantially one half the length of said strip.

7. A shingle strip having rectangular tabs along the edge that is to be exposed to the weather and having rectangular extensions along its other edge at its ends only.

8. A shingle strip wider at its ends than at its middle portion, said increased widths being provided by material disposed along the edge that is to be covered when the strip is installed.

9. A shingle strip having rectangular tabs along the edge that is to be exposed to the weather and having substantially rectangular extensions along its other edge at its ends only, forming substantially a rectangular cut out portion intermediate the rectangular extensions.

10. A shingle strip having a substantially straight longitudinal edge formed with rectangular spaced tabs, the sum of the areas of said tabs being substantially equal to the area of the space adjoining said tabs, said shingle strip having the other edge formed with shingle-like extensions, said rectangular tabs being oppositely disposed with respect to said extensions.

11. A shingle strip having a substantially straight longitudinal edge formed with narrow spaced tabs, the sum of the areas of said tabs being substantially equal to the area of the spaces adjoining said tabs, said shingle strip having the other edge formed with shingle-like extensions, said narrow tabs being oppositely disposed with respect to said extensions.

12. A shingle strip having a substantially straight longitudinal edge formed with rectangular spaced tabs located thereon, said tabs being of equal size and the sum of the areas of said tabs being substantially equal to the areas of the spaces adjoining said tabs, said shingle strip having the other edge formed with shingle-like polygonal extensions, said rectangular tabs being oppositely disposed with respect to said extensions.

13. A shingle strip having a substantially straight longitudinal edge formed with narrow elongated rectangular spaced tabs located thereon, said tabs being of equal size and the sum of the areas of said tabs being equal to the areas of the spaces adjoining said tabs, said shingle strip having the other edge formed with shingle-like polygonal extensions other than rectangular, said rectangular tabs being oppositely disposed with respect to said extensions.

14. A shingle strip having a substantially straight longitudinal edge formed with spaced tabs, said tabs being positioned at the ends of said strip to form an intervening space, the sum of the areas of said tabs being equal to the area of said intervening space, said shingle strip having the other edge formed with shingle-like extensions, said tabs being oppositely disposed with respect to said extensions.

15. A shingle strip having spaced tabs on one edge thereof, said tabs being spaced to provide a substantially straight longitudinal edge on said shingle strip between said tabs, and having an outer longitudinal edge substantially parallel with said longitudinal edge of the strip, the sum of the areas of said tabs being not greater than the sum of the areas of the spaces on said longitudinal edge formed by the spacing of said tabs, said shingle strip having the other edge formed with shingle-like extensions, said tabs being oppositely disposed with respect to said extensions.

THE BARRETT COMPANY,
*Assignee of Ray P. Perry, Deceased,*
By NORMAN SCHAFF,
*Assistant Secretary.*